United States Patent [19]

Wootton et al.

[11] 4,222,483

[45] Sep. 16, 1980

[54] BELT CONVEYORS

[75] Inventors: Raymond J. Wootton, Wolverhampton; Kenneth E. Walker, West Midlands; Colin Smith, Wolverhampton, all of England

[73] Assignee: U.M.E.C.-Boydell (belting) Limited, Wolverhampton, England

[21] Appl. No.: 963,098

[22] Filed: Nov. 22, 1978

[30] Foreign Application Priority Data

Nov. 22, 1977 [GB] United Kingdom ............... 48495/77

[51] Int. Cl.$^2$ ............................................. B65G 15/02
[52] U.S. Cl. ................................... 198/831; 198/840; 198/841; 198/848
[58] Field of Search ............... 198/831, 837, 839, 840, 198/841, 848; 308/3 A, 3 R, 6 R

[56] References Cited

U.S. PATENT DOCUMENTS

| | | | |
|---|---|---|---|
| 2,114,146 | 4/1938 | Klein et al. | 198/852 X |
| 2,633,975 | 4/1953 | Koerber | 198/831 |
| 3,237,756 | 3/1966 | Pulver | 198/831 X |

FOREIGN PATENT DOCUMENTS 1359185  7/1974  United Kingdom ..................... 198/853

Primary Examiner—Robert B. Reeves
Assistant Examiner—Douglas D. Watts
Attorney, Agent, or Firm—Scrivener, Clarke, Scrivener & Johnson

[57] ABSTRACT

A belt conveyor in which the belt travels around a lateral curve or curves and comprises load-supporting belt sections (2) pivoted between transverse rods (1), has guide blocks (4) at the ends of the transverse rods (1) with bearing parts (20) which co-operate substantially without friction with runners (5) at the or each curve to guide the belt in its travel with reduced wear and tension. Preferably the bearing parts (20) and runners (5) are made of self-lubricating material. In one form the bearing parts are horizontally facing channels (20) in the blocks (4) engaged by tongue portions (25) of the runners (5). The blocks each have two adjacent transverse rods (1) retained to them. The transverse rods are also connected by links (3) alternately arranged against external surfaces of the blocks (4) and in grooves (18) in the blocks where they are connected to the rods.

10 Claims, 5 Drawing Figures

BELT CONVEYORS

This invention relates to belt conveyors of the kind in which the belts travel around lateral curves and comprise a series of transverse rods and a plurality of load-supporting belt sections extending between and pivoted to the transverse rods.

The transverse rods are usually retained against detachment from the belt sections by fixing washers rigidly, as by welding, to the ends of the rods, or by enlarging the ends of the rods. Hitherto at the or each lateral curve in the track along which the conveyor belt travels the washered or enlarged ends have engaged with runners alongside the belt which guide the belt around the curve. A problem has been that the engagement of the ends with the runner strips, particularly at the inside radius of the or each curve has resulted in heavy frictional wear on the ends and the runner strips, and considerable tension in the belt. Breakdowns of the belt frequently occur as a consequence of the wear and tension.

It is the primary object of the present invention to overcome the aforesaid problem.

The present invention consists in a belt conveyor comprising a support structure, a belt supported by said support structure and which travels along a path including a lateral curve, and runner strips mounted on said suppport structure adjacent the sides of said belt at said lateral curve, said belt comprising a series of transverse rods spaced apart longitudinally of said belt, a plurality of load-supporting belt sections extending between and pivoted to said transverse rods, and at opposite ends of said transverse rods and retained thereto guide blocks having bearing parts which co-operate substantially without friction with said runners.

Because of the substantially friction-free co-operation of the bearing parts with the runners minimal wear occurs between them, and there is a considerable reduction in the tension caused in the belt as it travels around the or each lateral curve.

The bearing parts may be integral with the blocks, or they may be elements attached to the blocks. In the latter arrangement the bearing parts may be rollers or wheels.

The blocks, or at least the bearing parts, may be made of a self-lubricating material in order to provide the required friction-free co-operation between the parts and the runners. The runners may also be made of a self-lubricating material or at least the parts thereof with which the bearing parts co-operate. Nylon is a suitable material or a hard wearing acetal resin such as DELRIN (Registered Trade Mark). Other materials may possibly be used.

Preferably the transverse rods pass through the blocks. Each block may have the end portions of two transverse rods extending through it which are adjacent to one another longitudinally of the belt. The block may have a circular hole for one of the transverse rods of complementary diameter to that rod, and a slot for the other rod, the minor dimension of the slot being complementary to the diameter of the rod and the major dimension extending lengthwise of the belt. The slot allows the relative movement between the two rods longitudinally of the belt which is necessary to enable the belt to travel around a lateral curve. Preferably the distance between the remote portions of the peripheries of the circular hole and the slot corresponds to the distance between the remote portions of the peripheries of the two rods when the belt travels a straight path, such that when the belt is travelling a straight path the rod engaged in the slot is against the end of the slot furthest from the circular hole.

The transverse rods may also be connected together at their opposite ends by links, preferably of metal. Each of these links may also have a circular hole which is engaged by one of two adjacent rods and a slot engaged by the other, the sizes and positioning of the hole and slot preferably corresponding to those of each block as described above. The link which is connected to the same pair of transverse rods as a block may be positioned against an external surface of the block. Links which connect the rods of the pair to the transverse rods which are immediately next to them longitudinally of the belt may be connected to the pair of rods within the block. To enable the connections to be made within the block a groove or grooves, or an open-ended slot or slots, may be provided in the block into which the links extend and transversely through which the rods pass to engage with the links.

The blocks may be retained to the transverse rods by inserting cotter pins through the ends of the rods, welding washers to the ends of the rods, as before, or in any other suitable manner. The retaining means has only to retain the blocks to the transverse rods; it does not engage with the runners and have to assist in guiding the belt at the lateral curves. The guiding is performed entirely by the co-operation of the bearing parts of the guide blocks with the runners. Accordingly the choice of retaining means is less restricted than hitherto.

It has previously been mentioned that the bearing parts may be integral with the blocks. In a preferred arrangement in which this is the case, the blocks are made of a self-lubricating material and have channels formed in them which serve as the bearing parts. The runners project into the channels. Conveniently the channels face horizontally outwards to the sides of the belt and the runners have horizontally inwardly directed portions or parts which engage in the channels. Alternatively the runners may have channels and the blocks have projections which serve as the bearing parts and engage in the channels.

In the arrangement in which the bearing parts are rollers or wheels, as previously mentioned, the rollers or wheels may rotate about substantially horizontal axes and run on horizontal surfaces of the runners. Alternatively, they may rotate about substantially vertical axes and the runners have tracks which face laterally inwardly or outwardly of the belt, and in which the rollers or wheels run.

The load-supporting belt sections may be of any desired form. They may, for example, be of open-work cranked or wavey form having a series of longitudinally extending components spaced apart transversely of the belt and joined at the ends by two rows of transversely extending cross components. The cross components may be tubular for the transverse rods to extend through. Perforate or imperforate plate form belt sections may also be used. The belt sections may be made as plastics mouldings.

As with the blocks, the belt sections may have circular holes for engagement by one of a pair of transverse rods and slots for engagement by the other rod of the pair. Preferably the distance between the remote portions of the peripheries of the circular holes and slots is greater than the distance between the remote portions of the peripheries of the pair of rods such that the belt sections float on the rods and are not subjected to the tensile loads on the belt. The tractive loads are are taken by the blocks and the links, leaving the belt sections subject substantially only to the loads which the belt supports when in use.

An embodiment of the invention will now be described by way of example only with reference to the accompanying drawings, in which, FIG. 1 is a plan view of part of the length of a belt conveyor in accordance with the invention, the belt being shown travelling a straight path;

Figure 1:
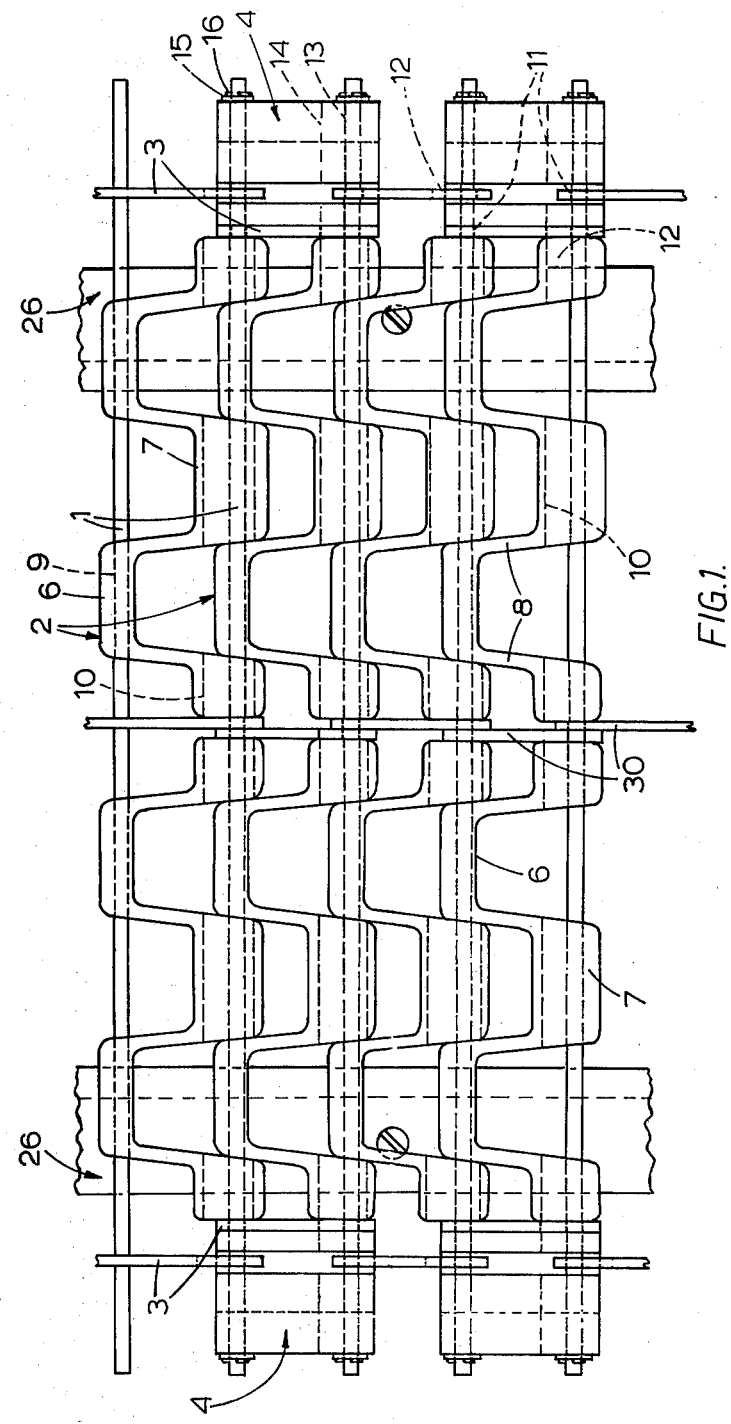

The belt of the belt conveyor comprises a series of transverse metal rods 1, a plurality of moulded plastics belt sections 2 spanning and pivoted to the transverse rods, metal links 3 connecting the transverse rods together at their ends laterally beyond the belt sections 2, and moulded plastics guide blocks 4 which are retained to the transverse rods at the ends thereof. The blocks co-operate with runners 5 of the conveyor at lateral curves along the path of travel of the belt.

The belt sections 2 are moulded from nylon. Each one has two parallel rows of cross components 6, 7 joined by a series of integral longitudinal components 8 extending lengthwise of the belt, such that the belt section is of cranked form. The cross components 6, 7 are of generally elongated block form of oblong rectangular cross-section. The cross components 6 in one row have co-axial circular holes 9 extending through them which are engaged by the transverse rods 1 and are of complementary diameter to the rods. The cross components 7 in the other row have slots 10 in them the major dimensions of which extend lengthwise of the belt. The minor dimensions of the slots 10 correspond to the diameters of the circular holes 9. The slots allow relative angular movement between the belt sections 2 and the transverse rods 1 to allow the belt to travel around a lateral curve.

The links 3 which connect the transverse rods 1 also each have a circular hole 11 and a slot 12 substantially similar to those of the cross components of the belt sections 2, except that the distance between the remote portions of the peripheries of the hole and slot is a little less than the distance between the remote portions of the peripheries of the holes and slots in each belt section. Thus when the belt is being driven the tractive load is taken by the links 3 rather than by the belt sections.

Figure 2:
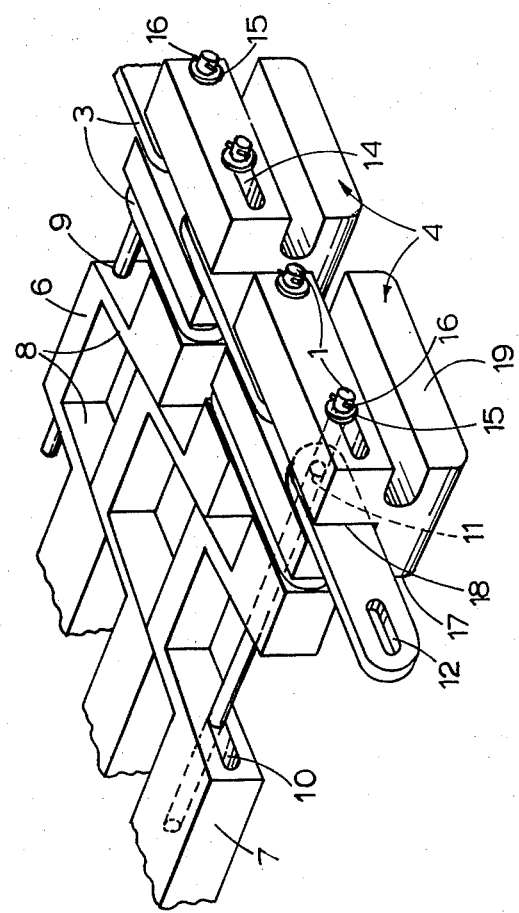
FIG. 2 is a top perspective view of a side part of the conveyor belt.
Figure 4:
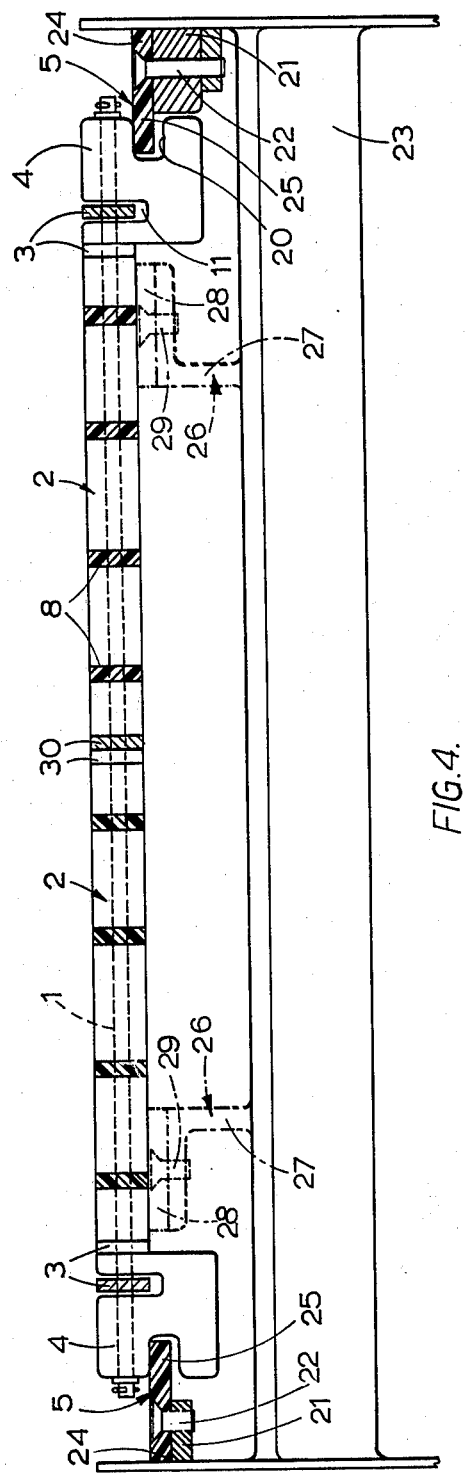
FIG. 4 is a section on line 4—4 of FIG. 1.
Figure 5:
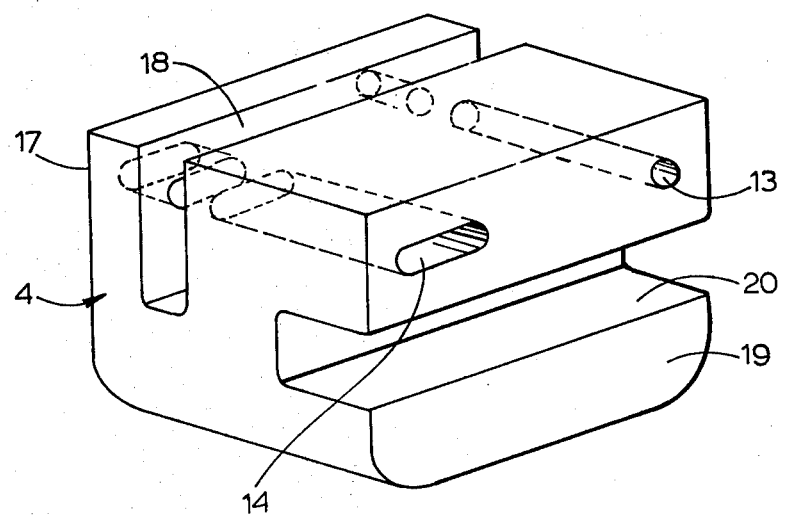
FIG. 5 is a top perspective view of a guide block.

The transverse rods are connected in pairs by the guide blocks 4, there being a guide block at each end of each pair. Each block is made from nylon. As best seen in FIGS. 2 and 5, each block has a circular hole 13 extending through it and a slot 14 which respectively correspond in cross-section, size and relative positioning to the holes 11 and slots 12 in the links 3. End portions of the pair of rods which the guide block connects pass through the hole 13 and slot 14 and are fitted at their extremities with washers 15 and cotter pins 16 which retain the guide block to the rods, and at the same time secure the rods to the belt sections and links 3. The blocks are similar in length to the links but appreciably deeper and they have the holes 13 and slots 14 in their upper portions. Lower portions of the blocks project below the level of the undersides of the belt sections, as shown in FIG. 4. That link which connects the same pair of transverse rods as an adjacent guide block is disposed against an inner side face 17 of the block which is directed towards the belt sections. The links which connect these transverse rods to the next rods along the length of the belt are accommodated in opposite ends of a groove 18 in the top of the block which runs lengthwise of the block and intersects the hole 13 and slot 14. In an outer side face 19 of the block at its lower portion there is a channel 20 which extends horizontally along the block and co-operates with the runners 5.

The slots 12 in the links 3 and the slots 14 in the blocks allow angular movement of the links and blocks relative to the transverse rods, and vice versa.

Figure 3:
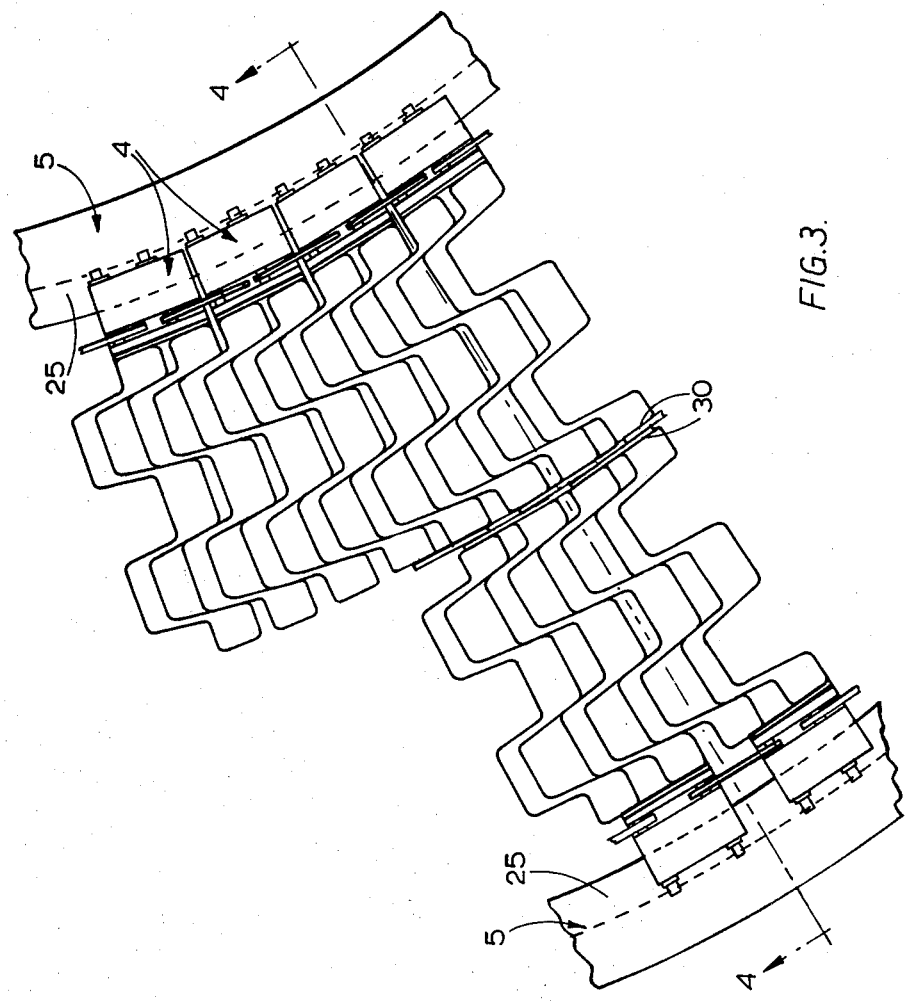
FIG. 3 is a plan view of part of the length of the belt conveyor with the belt shown travelling around a lateral curve.

Each runner 5 has a metal base member 21, (FIG. 4) by which it is secured by screws 22 to a supporting framework 23 for the belt, and a hard wearing plastics, preferably nylon or DELRIN, top member 24 having a laterally inwardly projecting tongue portion 25 with a smooth surface. The tongue portion 25 is of complementary section to the channel 20 of each guide block in which it engages. When engaged with the channel of a block the tongue portion supports the block, and thereby provides support for the belt, and it guides the block, and hence the belt, as shown in FIG. 3, in its travel around a lateral curve in the path of travel of the belt.

The materials of which the blocks and the top members 24 are made allow the blocks to slide freely, substantially without friction, along the smooth tongue portions 25. Accordingly the belt runs easily around a lateral curve so that any tension caused by the curved travel is kept low and excessive loading on the belt drive is avoided. Wear of the belt components is also reduced.

Along the straight part of its travel the belt is carried by support strips 26, FIG. 1 (and also indicated in phantom in FIG. 4 only to show their form more fully). The support strips 26 are engaged by the belt sections 2 near the sides of the belt. The belt sections merely rest on the support strips. Each support strip comprises a metal angle-section base member 27 welded to the framework 23 by one of its flanges, and a hard-wearing plastics, again preferably nylon or DELRIN, smooth top member 28 which is secured by screws 29 to the other flange of the base member and forms a runner for the belt sections to run along.

The drive for the belt is provided in known manner by power driven sprockets, not shown, below the belt which mesh with the cross components of the belt sections.

In the drawings two belt sections are shown arranged end to end across the width of the belt between each pair of transverse rods. Additional links 30 similar to the links 3 at the ends of the transverse rods are connected to the rods intermediate the two belt sections. These assist in maintaining the rods at the correct distance apart and restrain the rods from flexing under the tractive loads. Depending upon the required width of the belt there may be more than two belt sections across the width of the belt, or there may be just one belt section which extends across the full width of the belt.

We claim:

1. A belt conveyor comprising a support structure, a belt supported by said support structure and which travels along a path including a lateral curve, and runners mounted on said support structure adjacent the sides of said belt at said curve, said belt comprising a series of transverse rods spaced apart longitudinally of said belt, a plurality of load-supporting belt sections extending between and pivoted to said transverse rods being constructed and arranged to allow relative movement between themselves and said transverse rods longitudinally of said belt when said belt travels around said lateral curve, guide blocks at and retained to opposite end portions of said transverse rods having bearing parts which co-operate substantially without friction with said runners, each said guide block having said end portions of two adjacent said transverse rods retained thereto, and said guide blocks being formed with recesses therein extending lengthwise of said belt transversely through which said end portions pass, and links which interconnect said transverse rods at said end portions within said recesses, said blocks and links being constructed and arranged to allow relative movement between said transverse rods longitudinally of said belt when said belt travels around said lateral curve.

2. A belt conveyor comprising a support structure, a belt supported by said support structure and which travels along a path including a lateral curve, and runners mounted on said support structure adjacent the sides of said belt at said curve, said belt comprising a series of transverse rods spaced apart longitudinally of said belt a plurality of load-supporting belt sections extending between and pivoted to said transverse rods, guide blocks at and retained to opposite end portions of said transverse rods having bearing parts which co-operate substantially without friction with said runners and each said guide block being formed with a recess therein extending lengthwise of said belt, and links which interconnect said transverse rods at said end portions, each said block having retained thereto said end portions of two of said transverse rods which are adjacent longitudinally of said belt, said end portions passing transversely through said recess, each said link interconnecting an adjacent pair of said transverse rods, each said block and link being constructed and arranged to allow relative movement between said transverse rods longitudinally of said belt when said belt travels around said lateral curve, said links which are connected to the same pairs of said transverse rods as said blocks being positioned against external surfaces of said blocks, and said links which connect said pairs of transverse rods to said transverse rods immediately next to them longitudinally of said belt extending into said recesses of said blocks and being connected to said transverse rods within said recesses.

3. A belt conveyor according to claim 2 wherein said recesses are grooves in surfaces of said blocks which are uppermost as said belt travels along said path.

4. A belt conveyor according to claim 2 wherein said blocks have channels in them which serve as said bearing parts and said runners project into said channels.

5. A belt conveyor according to claim 4 wherein said channels face horizontally outwards to the sides of said belt, and said runners having horizontally inwardly-directed parts which engage in said channels.

6. A belt conveyor according to claim 2 wherein said recesses and said end portions are in portions of said blocks which are uppermost as said belt travels along said path and said bearing parts are at portions of said blocks below said end portions.

7. A belt conveyor according to claim 2 wherein each said block has a circular hole through which said end portion of a first one of said two transverse rods passes, and a slot through which said end portion of a second one of said two transverse rods passes, said circular hole being of complementary diameter to said first transverse rod, said slot having a minor dimension complementary to the diameter of said second transverse rod and a major dimension extending lengthwise of said belt, and wherein each said link has a circular hole of complementary diameter to and through which passes said end portion of a first one of said adjacent pair of transverse rods, and a slot which extends lengthwise of said belt and has a minor dimension complementary to the diameter of a second one of said adjacent pair of said transverse rods which passes through said slot, said links positioned against said external surfaces of said blocks having said circular holes and slots thereof in register respectively with said circular holes and slots of said blocks, and said links which extend into said recesses of said blocks having said circular holes and said slots thereof in register respectively with said slots and circular holes of said blocks.

8. A belt conveyor according to claim 2 wherein each said block is a substantially rectangular plastics moulding formed with a groove in a horizontal surface thereof, said groove extending longitudinally of said belt and defining said recess of said block, apertures intersecting said groove which receive said end portions of said two transverse rods and which are shaped to allow relative movement between said transverse rods longitudinally of said belt, and a channel in a vertical surface of said block, said channel extending longitudinally of said belt and serving as said bearing part of said block.

9. A conveyor belt constructed and arranged for travel along a path including a lateral curve, comprising a series of transverse rods spaced apart longitudinally of said belt, a plurality of load-supporting belt sections extending between and pivoted to said transverse rods, guide blocks at opposite ends of and retained to said transverse rods having substantially friction-less bearing parts adapted to co-operate when the belt is in use with runners adjacent the sides of the belt at the lateral curve, each said guide block having said end portions of two adjacent said transverse rods retained thereto and said guide blocks being formed with recesses therein extending lengthwise of said belt transversely through which said end portions pass, and links which interconnect said transverse rods at said end portions within said recesses, said blocks and links being constructed and arranged to allow relative movement between said transverse rods longitudinally of said belt when said belt travels around said lateral curve.

10. A conveyor belt constructed and arranged for travel along a path including a lateral curve, comprising a series of transverse rods spaced apart longitudinally of said belt, a plurality of load-supporting belt sections extending between and pivoted to said transverse rods, guide blocks at and retained to opposite end portions of said transverse rods having substantially friction-less bearing parts adapted to co-operate when the belt is in use with runners adjacent the sides of the belt at the lateral curve and each said guide block being formed with a recess therein extending lengthwise of said belt, and links which interconnect said transverse rods at said end portions, each said block having retained thereto said end portions of two of said transverse rods which are adjacent longitudinally of said belt, said end portions passing transversely through said recess, each said link interconnecting an adjacent pair of said transverse rods, each said block and link being constructed and arranged to allow relative movement between said transverse rods longitudinally of said belt when said belt travels around said lateral curve, said links which are connected to the same pairs of said transverse rods as said blocks being positioned against external surfaces of said blocks, and said links which connect said pairs of transverse rods to said transverse rods immediately next to them longitudinally of said belt extending into said recesses of said blocks and being connected to said transverse rods within said recesses.

* * * * *